Feb. 13, 1934.  H. J. STEGEMAN ET AL  1,947,117
POWER DRIVEN LAWN MOWER
Filed Aug. 15, 1931  4 Sheets-Sheet 2
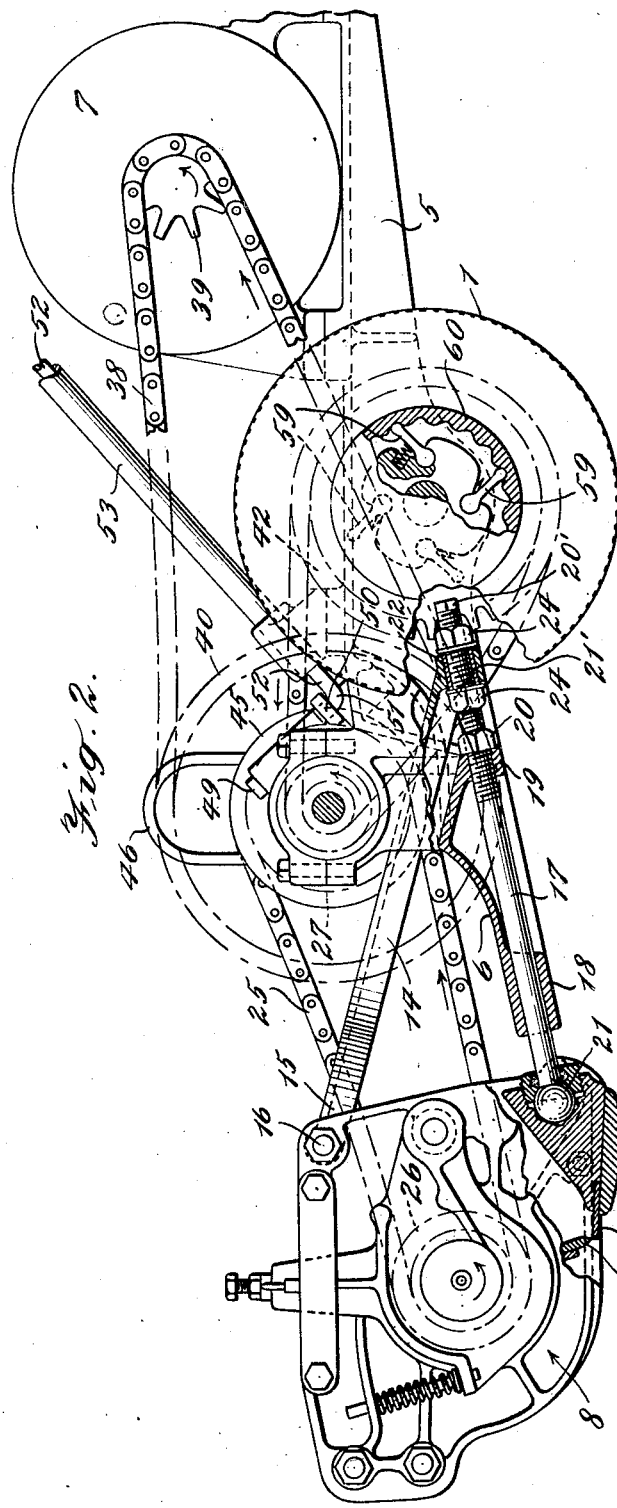
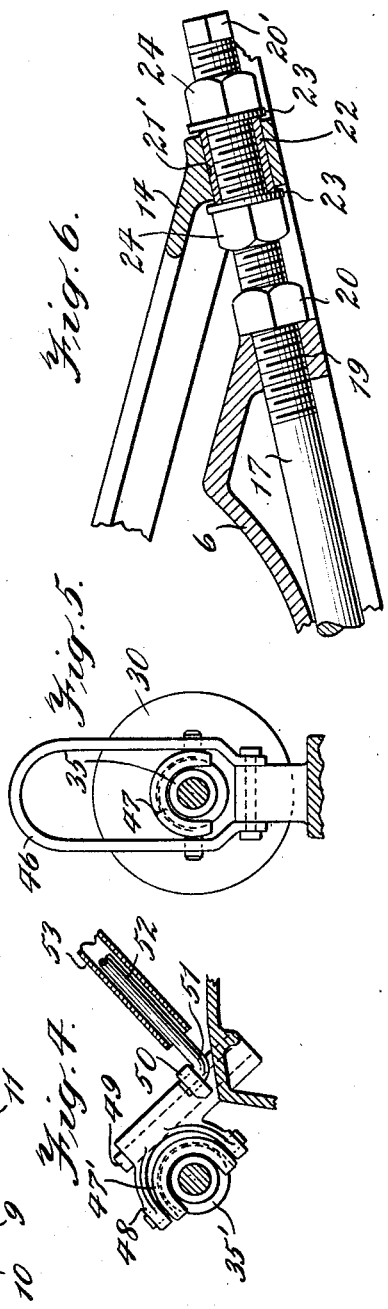
INVENTORS.
Henry J. Stegeman
BY Sylvanus D. Locke
Gifford, Scull & Burgess
ATTORNEYS.

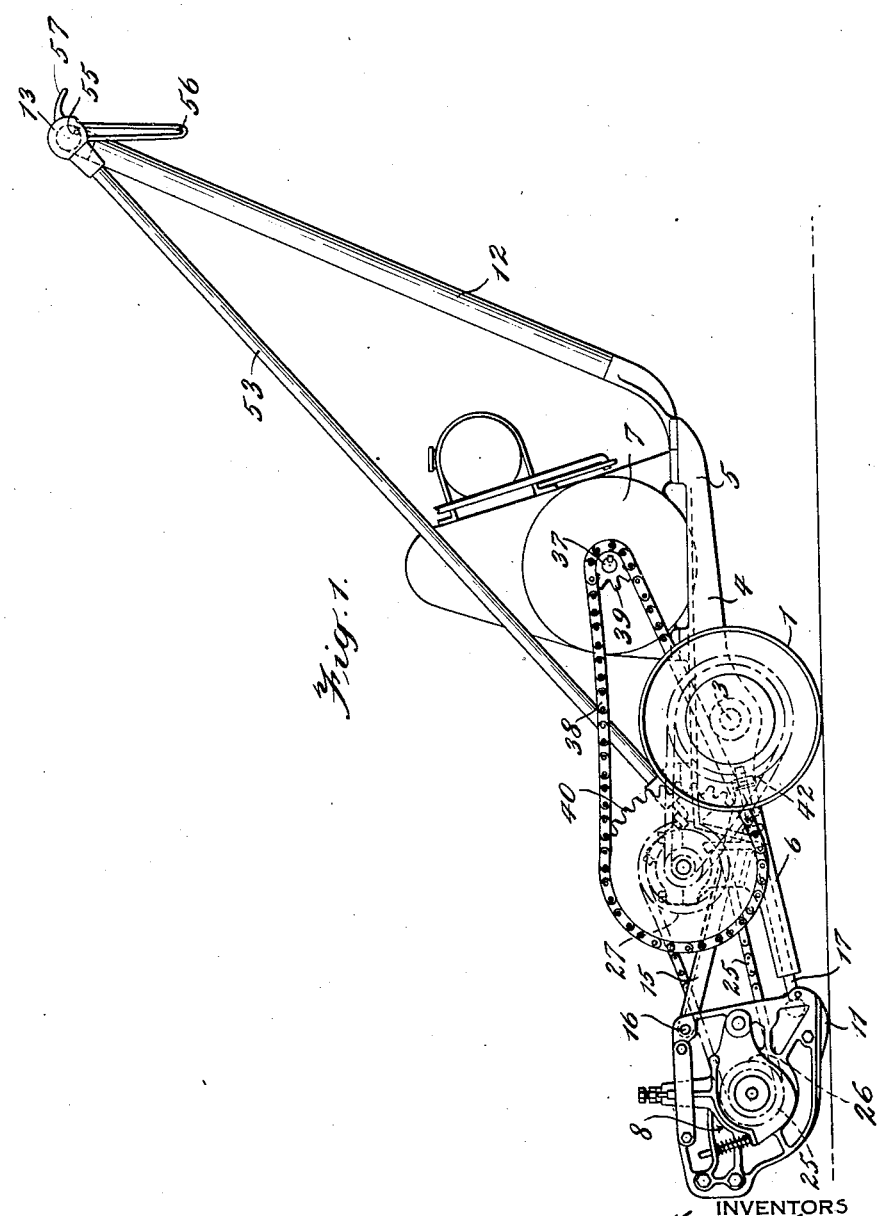

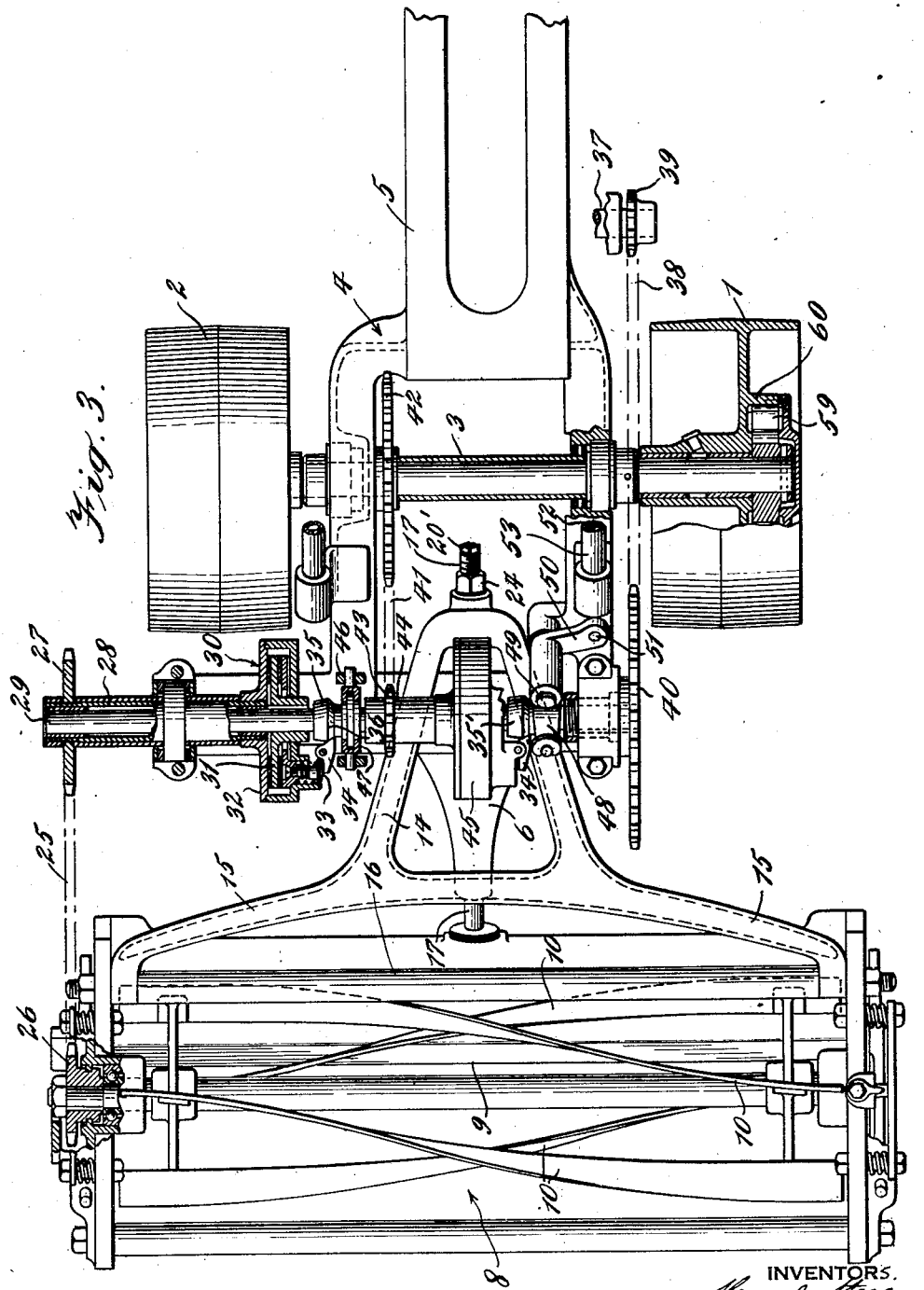

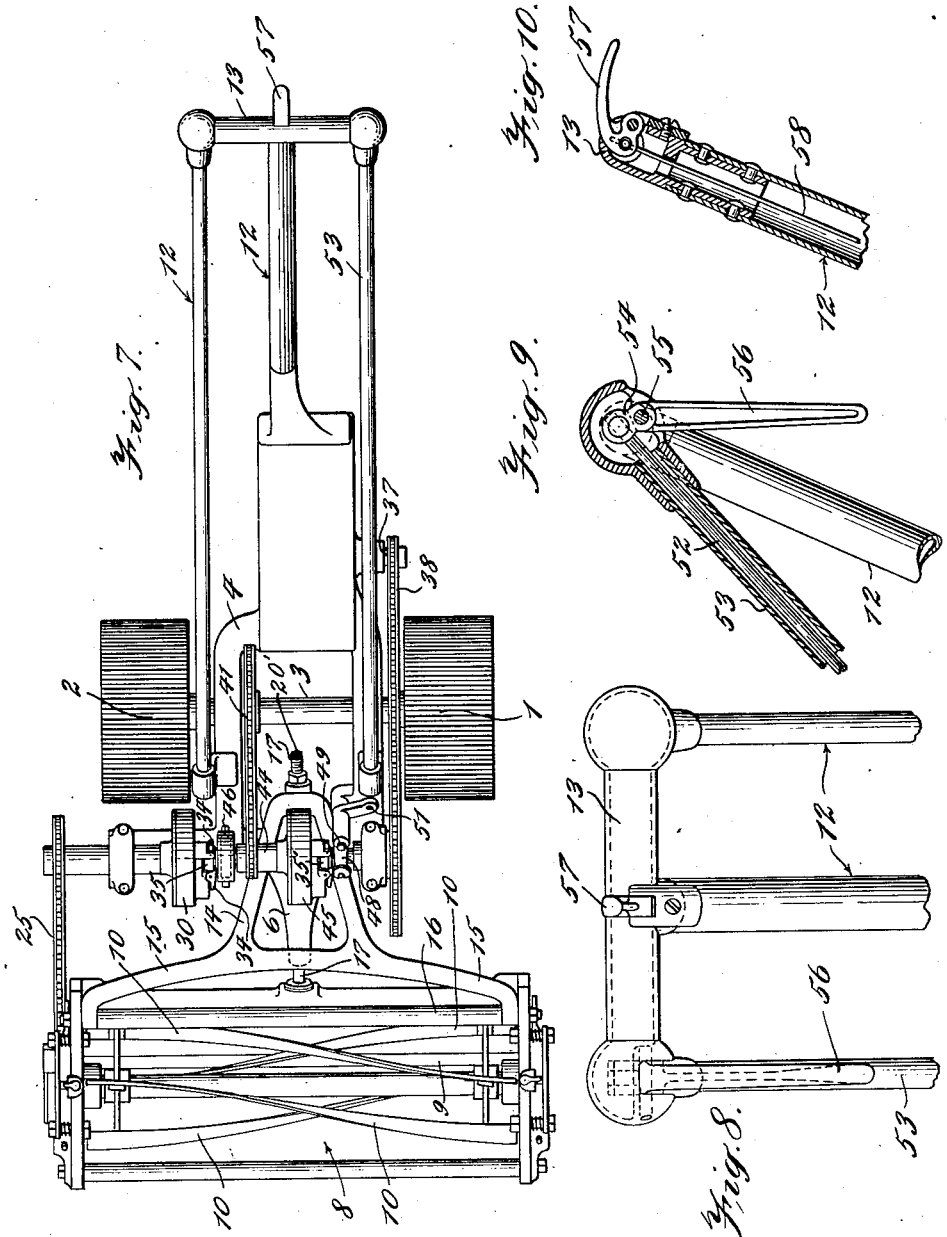

Patented Feb. 13, 1934

1,947,117

UNITED STATES PATENT OFFICE 1,947,117

POWER DRIVEN LAWN MOWER

Henry J. Stegeman, Fairfield, and Sylvanus D. Locke, Bridgeport, Conn., assignors to The Locke Steel Chain Company, Bridgeport, Conn., a corporation of Connecticut Application August 15, 1931. Serial No. 557,238

36 Claims. (Cl. 56—26)

This invention relates to a novel and improved lawn mower, particularly the type driven and operated by power. The novel features will be best understood from the following description and the annexed drawings, in which we have shown a selected embodiment of the invention, and in which:—

Fig. 1 is a side elevation of a lawn mower constructed according to the invention.

Fig. 2 is a fragmentary view similar to Fig. 1 but on an enlarged scale, parts being broken away and parts shown in section.

Fig. 3 is a plan view of the structure shown in Fig. 2, parts being broken away and parts shown in section.

Fig. 4 is a detail of the operating means for one of the clutches shown in Fig. 3.

Fig. 5 is a detail of the operating means for the other clutch shown in Fig. 3.

Fig. 6 is a view on an enlarged scale of one of the details appearing in Fig. 2.

Fig. 7 is a plan view of the entire mower.

Figs. 8, 9 and 10 are detail views illustrating the arrangement of the controlling means for the motor and one of the clutches.

The invention is shown as embodied in a machine comprising a pair of ground-engaging rolls 1 and 2, supporting and connected by an axle 3. Pivotally supported on this axle is a frame 4 having a rearwardly extending bracket 5 and a forwardly extending bracket 6, this frame being freely movable on the axle circumferentially thereof. Supported on the bracket 5 is a motor 7 and to the forwardly extending bracket 6 is connected a cutter 8. This cutter may be of any suitable type, here shown as of the type fully shown and claimed in our copending application Serial No. 299,658, now Patent No. 1,886,408. Further details of the cutter will therefore be omitted except as they are material to an understanding of our present invention. The cutter comprises a stationary knife 9 cooperating with rotating knives 10 forming part of the well-known reel common to lawn mowers.

The stationary knife 9 is supported on a shoe 11 engaging the ground and bearing some of the weight of the cutter, the motor 7 counterbalancing the rest, so that the shoe engages the ground with relatively little force. Connected to the bracket 5 is a framework 12 having a handle 13 with which the operator may manipulate the mower, and on which he may bear down to still further relieve the pressure on the shoe.

The cutter 8 is mounted in a sub-frame 14 having transversely extending arms 15 pivoted to a bar 16 on the cutter, thus preventing transverse movement of the cutter on the sub-frame, but permitting longitudinal rocking movement, it being understood that the word "longitudinal" is used herein as referring to the direction of travel and the word "transverse" is used to denote a direction lateral to said direction of travel. The sub-frame is mounted on a longitudinal pivot 17 so that it may rock transversely with the cutter, and so that the cutter may accommodate itself to unevenness in the ground.

The pivot 17 is shown as a push-rod extending through alined openings in the bracket 6 of the frame, these openings being formed in ears 18 and 19 on the bracket. The rod is threaded into engagement with the ear 19 so that it will normally be held stationary, and so that it may be adjusted longitudinally, it being locked in adjusted position by means of a nut 20. The forward end of the rod is shown as a ball 21, held in a socket in the cutter, closely adjacent the transverse center of the shoe 11 and beneath the stream of grass thrown back by the cutter. The shoe being rigidly fastened to the cutter, the push-rod is thus substantially connected directly to the shoe, so as to push it forwardly without causing it to tip about either a longitudinal or a transverse axis. More specifically, there is practically no tendency to tip about a longitudinal axis extending through one end of the shoe, when the mower is turning a corner, for example. The ball and socket connection provides a longitudinal pivotal connection, transverse to the pivot 17, so that the cutter may rock transversely of the pivot 17 to accommodate itself to the ground. This same connection also permits an adjustment of the cutter to vary the height of cut, by rocking the cutter on the shoe 11. This adjustment may be effected by loosely passing the pivot or rod 17 through an opening in the sub-frame 14, as at 21', the rod at this point being provided with a bushing 22 longer than the opening and contacting at opposite ends with washers 23 held in place by nuts 24 threaded on the rod.

The cutter may be driven by a chain 25 engaging a sprocket 26 on the end of the shaft of the rotating knives and a sprocket 27 on a drive shaft 28, which is shown in the form of a sleeve surrounding a shaft 29 mounted in suitable bearings on the frame 4. The rotating knives move in a counterclockwise direction as viewed in Figs. 1 and 2, and so it will be seen that the lower stretch of the chain is the tight one while the upper stretch is the slack one. The tight stretch is arranged substantially parallel to the push rod 17, whereby the force exerted by the chain, when operating the cutter, will be parallel to the longitudinal pivot of the cutter. This force then will have no component transverse to the pivot as viewed in Figs. 1 and 2, and so will not tend to cause rotation of the cutter on that pivot. For the same reason, when the cutter does rotate or rock on the pivot as the cutter passes over uneven ground, the force exerted by the chain resists that rocking and tends to return the cutter to position where the force acts parallel to the pivot.

The arrangement just described constitutes an improvement on that described and claimed in our copending application Serial No. 21,470, which has now matured into Patent No. 1,819,133 wherein the cutter is mounted on a longitudinal pivot, but wherein the driving means is not arranged with respect to the pivot as described above, to prevent rocking of the cutter on its longitudinal pivot.

According to the present invention, the pushrod or pivot may be adjusted longitudinally to loosen or tighten the chain, by loosening the nut 20, rotating the rod as by engagement of a wrench with its squared end 20', and then tightening the nut again. The nuts 24 will turn with the rod for this slight adjustment, the length of the bushing 22 beyond the opening 21 being sufficient under usual circumstances. The ball and socket connection to the cutter permits the turning of the push rod. The nuts 24 will turn with the rod and carry with them the bushing 22, against which they are tightly set. The bushing 22 will turn in the opening 21' of the frame 14. Thus the relation between the frame 14 and the pivot bar or push rod 17 will not be disturbed and the cutter unit will be carried forward or back without being tilted. If it is desired to vary the height of cut, this may be done by moving the nuts 24 and the associated bushing 22 along the rod. This will move the sub-frame 14 and with it the bar 16 to cause rotation of the cutter about the shoe 11. This adjustment will cause a slight raising or lowering of the sprocket 26, but not enough to materially affect the relation between the tight stretch of the chain 25 and the longitudinal pivot 17.

The shaft 29 may drive the shaft or sleeve 28 by means of a clutch 30, which may be of the form shown in our copending application Serial No. 299,658, Patent 1,886,408, and which comprises a friction disk 31 splined on the shaft 29 and cooperating with a friction disk 32 fast on the sleeve 28. The disks are brought together or separated by a plurality of plungers 33 operated by levers 34 actuated by a cam 35 having conical surfaces sloping in opposite directions from a common circumference 36 defining a nose on the cam. The cam may be slid along the shaft and, as the nose passes the ends of the levers 34, the levers are thus prevented from moving back until the nose has passed them in the opposite direction.

The clutch just described is thus used to control the driving connection from the motor to the cutter, the shaft 29 being driven from the motor shaft 37 by a chain 38 engaging a sprocket 39 on the motor shaft and a sprocket 40 on the shaft 29. The rolls 1 and 2 may be driven from the shaft 29 by a chain 41 engaging a sprocket 42 on the axle 3 and a sprocket 43 on a sleeve 44 on the shaft 29. The sleeve 44 may be driven from the shaft 29 through a clutch 45 similar in construction to the clutch 30 and likewise operated by a cam 35 slidable on the shaft 29.

In practice, the cutter will usually be kept continually in operation for long periods of time, and therefore the clutch 30 controlling the driving connection of the cutter is operated by a simple hand or foot actuated lever 46 (Figs. 3 and 5) pivoted to a yoke 47 connected to the cam 35. The driving connection for the rolls 1 and 2, however, is usually made and broken more frequently, and therefore we provide means controlling the clutch 45 from the handle. This may be done by operating the cam 35' through a yoke 47' (Fig. 4) connected to the cam and actuated by a lever 48 pivoted at 49 and having an arm 50 in which is received the hooked end 51 of a rod 52 extending through a hollow post 53 forming part of the framework 12. The upper end of the rod 52 (Fig. 9) is connected to a lever 54 pivoted at 55 and having a handle 56 depending from the handle 13. The parts are so arranged that when this handle 56 is moved forwardly, the clutch 45 will be thrown in, to cause forward movement of the mower, while a rearward movement of the same handle 56 will cause stoppage of that movement.

The motor may conveniently be controlled by a handle 57 pivoted on the handle 13 and connected to a rod 58 leading through the framework to the motor to control the speed thereof.

The axle 3 is preferably connected to the rolls 1 and 2 by means of one-way ratchet drives, one of which is indicated in Fig. 2, as comprising pawls 59 cooperating with a ratchet 60 in a manner well known in the art. The use of these ratchet drives on the two rolls provides a differential driving connection therefor, so that the mower may readily turn corners.

While we have shown the invention as embodied in a specific form, it is, of course, understood that various changes in that form may be made without departing from the spirit of the invention, and therefore we do not intend to limit ourselves except by the appended claims.

We claim:

1. In a power-driven lawn mower, ground-engaging rolls connected by an axle, a frame pivotally mounted and freely movable circumferentially of said axle and extending forwardly and rearwardly therefrom, a cutter mounted on said frame forwardly of said axle and comprising a ground-engaging shoe, a motor mounted on said frame rearwardly of said axle and counterbalancing the weight of said cutter to partly remove said weight from said shoe, means to drive said rolls from said motor, and means to drive the cutter from the motor.

2. In a power-driven lawn mower, ground-engaging rolls connected by an axle, a frame pivotally mounted and freely movable circumferentially of said axle and extending forwardly and rearwardly therefrom, a cutter mounted on said frame forwardly of said axle on a longitudinal pivot and comprising a ground-engaging shoe, a motor mounted on said frame rearwardly of said axle and counterbalancing the weight of said cutter to partly remove said weight from said shoe, means to drive said rolls from said motor, and means to drive the cutter from the motor.

3. In a power-driven lawn mower, ground-engaging rolls connected by an axle, a frame pivotally mounted on said axle and extending forwardly and rearwardly therefrom, a cotter mounted on said frame forwardly of said axle on a longitudinal pivot and comprising a ground-engaging shoe, a motor mounted on said frame rearwardly of said axle and counterbalancing the weight of said cutter to partly remove said weight from said shoe, means to drive said rolls from said motor, and means to drive the cutter from the motor, said driving means for the cutter being arranged to resist rocking of the cutter on the pivot while permitting said rocking.

4. In a power-driven lawn mower, ground-engaging rolls connected by an axle, a frame pivotally mounted on said axle and extending forwardly and rearwardly therefrom, a cutter mounted on said frame forwardly of said axle on a longitudinal pivot and comprising a ground-engaging shoe, a motor mounted on said frame rearwardly of said axle and counterbalancing the weight of said cutter to partly remove said weight from said shoe, means to drive said rolls from said motor, means to drive the cutter from the motor, a pivotal connection between said pivot and the cutter extending transversely of the pivot, means for adjusting the cutter on said connection, and means for locking the cutter in adjusted position.

5. In a power-driven lawn mower, ground-engaging rolls connected by an axle, a frame pivotally mounted and freely movable circumferentially of said axle and extending forwardly and rearwardly therefrom, a cutter mounted on said frame forwardly of said axle on a longitudinal pivot and comprising a ground-engaging shoe, a motor mounted on said frame rearwardly of said axle and counterbalancing the weight of said cutter to partly remove said weight from said shoe, means to drive said rolls from said motor, means to drive the cutter from the motor, and a differential connection between said rolls.

6. In a power-driven lawn mower, a ground-engaging roll having a transversely extending shaft, a frame extending forwardly and rearwardly of said shaft and freely pivoted thereon, a cutter on said frame forwardly of said shaft and mounted on a longitudinally extending pivot, a ground-engaging shoe on said cutter, a motor mounted on said frame rearwardly of said shaft, and means to drive said roll and said cutter from said motor.

7. In a power-driven lawn mower, a ground-engaging roll having a transversely extending shaft, a frame extending forwardly and rearwardly of said shaft and pivoted thereon, a cutter on said frame forwardly of said shaft and mounted on a longitudinally extending pivot, a ground-engaging shoe on said cutter, a motor mounted on said frame rearwardly of said shaft, means to drive said roll and said cutter from said motor, a pivotal connection between said pivot and the cutter extending transversely of the pivot, means for adjusting the cutter on said connection, and means for locking the cutter in adjusted position.

8. In a power-driven lawn mower, a ground-engaging roll having a transversely extending shaft, a frame mounted on said shaft and extending in the direction of travel of the mover, a cutter disposed forwardly of said roll and having a rotary knife and a ground-engaging shoe, a push-rod extending in said direction and connected to said frame and to said cutter to push the cutter from the frame, said rod being connected to said cutter at a point below the stream line of the cut grass.

9. In a power-driven lawn mower, a ground-engaging roll having a transversely extending shaft, a frame mounted on said shaft and extending in the direction of travel of the mover, a cutter disposed forwardly of said roll and having a rotary knife and a ground-engaging shoe, a push-rod extending in said direction and connected to said frame and to said cutter to push the cutter from the frame, said rod being connected to said cutter at a point below the stream line of the cut grass and forming a pivot on which said cutter may rock.

10. In a power-driven lawn mower, a ground-engaging roll having a transversely extending shaft, a frame mounted on said shaft and extending in the direction of travel of the mower, a cutter disposed forwardly of said roll and having a ground-engaging shoe, a sub-frame on which said cutter is mounted, a member extending in said direction of travel and connecting said sub-frame to said frame, and a universal connection between said sub-frame and said member.

11. In a power-driven lawn mower, a ground-engaging roll having a transversely extending shaft, a frame mounted on said shaft and extending in the direction of travel of the mower, a cutter spaced from said roll in said direction of travel and having a ground-engaging shoe, a sub-frame on which said cutter is mounted, a longitudinal pivot connecting said sub-frame to said frame, a pivotal connection between said pivot and the sub-frame extending transversely of the pivot, means for adjusting the sub-frame on said connection, and means for locking the sub-frame in adjusted position.

12. In a power-driven lawn mower, a ground-engaging roll having a transversely extending shaft, a frame mounted on said shaft and extending in the direction of travel of the mower, a cutter spaced from said roll in said direction of travel and having a ground-engaging shoe, a sub-frame on which said cutter is mounted, a longitudinal pivot connecting said sub-frame to said frame, a motor on said frame, means to drive the cutter from the motor, and means to adjust the sub-frame with respect to the frame along said pivot.

13. In a power-driven lawn mower, a ground-engaging roll having a transversely extending shaft, a frame mounted on said shaft and extending in the direction of travel of the mower, a cutter spaced from said roll in said direction of travel and having a ground-engaging shoe, a sub-frame on which said cutter is mounted, a longitudinal pivot connecting said sub-frame to said frame, a pivotal connection between said pivot and the sub-frame extending transversely of the pivot, means for adjusting the sub-frame on said connection, means for locking the sub-frame in adjusted position, a motor on said frame, means to drive the cutter from the motor, and means to adjust the sub-frame with respect to the frame along said pivot.

14. In a power-driven lawn mower, a ground-engaging roll having a transversely extending shaft, a frame mounted on said shaft and extending in the direction of travel of the mower, a cutter spaced from said roll in said direction of travel and having a ground-engaging shoe, a sub-frame on which said cutter is mounted, a longitudinal pivot connecting said sub-frame to said frame and threaded through an opening in said frame, and means to lock said pivot in said opening.

15. In a power-driven lawn mower, a ground-engaging roll having a transversely extending shaft, a frame mounted on said shaft and extending in the direction of travel of the mower, a cutter spaced from said roll in said direction of travel and having a ground-engaging shoe, a sub-frame on which said cutter is mounted, a longitudinal pivot connecting said sub-frame to said frame and threaded through an opening in said frame, and means to lock said pivot in said opening, said pivot also passing freely an opening in the sub-frame.

16. In a power-driven lawn mower, a ground-engaging roll having a transversely extending shaft, a frame mounted on said shaft and extending in the direction of travel of the mower, a cutter spaced from said roll in said direction of travel and having a ground-engaging shoe, a sub-frame on which said cutter is mounted, a longitudinal pivot connecting said sub-frame to said frame and threaded through an opening in said frame, means to lock said pivot in said opening, said pivot also passing freely through an opening in the sub-frame, a bushing within said second opening and projecting from opposite ends thereof, and nuts threaded on said pivot against said opposite ends.

17. In a power-driven lawn mower, a ground-engaging roll having a frame mounted thereon, a cutter spaced from said roll in the direction of travel of the mower and comprising a stationary knife and a rotating knife, a motor mounted on said frame, a member for driving said rotary knife from said motor, and a push-rod connecting said frame and cutter and disposed substantially parallel to the direction of the driving force exerted by said member.

18. In a power-driven lawn mower, a ground-engaging roll having a frame mounted thereon, a cutter spaced from said roll in the direction of travel of the mower and comprising a stationary knife and a rotating knife, a motor mounted on said frame, a sprocket on said rotary knife, a chain engaging said sprocket and driven from said motor, and a rod connecting said frame to said cutter with a pivotal connection permitting rocking of the cutter transversely of the direction of travel, said rod being disposed substantially parallel to the tight stretch of said chain.

19. In a power-driven lawn mower, a ground-engaging roll having a frame mounted thereon, a cutter disposed in front of said roll and comprising a stationary knife and a rotating knife, a motor mounted on said frame, a pivotal connection between said frame and cutter extending in the direction of travel, a sprocket at one end of said rotary knife, a chain engaging said sprocket and driven from said motor, a ground-engaging shoe on said cutter, said pivotal connection being located on said cutter at a distance above the bottom of the shoe which is small compared to the length of said shoe transversely of the direction of travel.

20. In a power-driven lawn mower, a ground-engaging roll and a cutter, a frame connecting said roll and cutter, a motor mounted on said frame and operatively connected to the roll and to the cutter, clutches controlling said connections, a handle extending rearwardly from said roll, a clutch-operating lever pivotally mounted on said handle, connections between said lever and said roll-controlling clutch constructed to cause engagement of said clutch upon forward movement of said lever, and other means to operate said cutter-controlling clutch.

21. In a power-driven lawn mower, a ground-engaging roll having a frame mounted thereon, a cutter spaced from said roll in the direction of travel of the mower and comprising a stationary knife and a rotating knife, a motor mounted on said frame, a connection from said frame to said cutter to move the cutter over the ground, said connection including a pivot extending in the direction of travel and about which said cutter may rock transversely of said direction of travel, and a driving connection from the motor to the cutter, said connections being so related to each other as to resist said rocking of the cutter and when rocked to bring it back to normal position.

22. In a power-driven lawn mower, a ground-engaging roll having a transversely extending shaft, a frame pivotally mounted and freely movable on said shaft circumferentially thereof and extending forwardly and rearwardly therefrom, a cutter mounted on said frame forwardly of said shaft and comprising a ground-engaging shoe, a motor mounted on said frame rearwardly of said shaft and counterbalancing the weight of said cutter to partly remove said weight from said shoe, said motor having a shaft, and means to drive either said roll or said cutter or both from said shaft.

23. In a power-driven lawn mower, a ground-engaging roll having a frame mounted thereon, a cutter disposed in front of said frame, and a member extending forwardly from said frame to said cutter to push the same over the ground as the roll rotates, said member being connected to said cutter by a ball and socket connection.

24. In a power-driven lawn mower, a ground-engaging roll having a frame mounted thereon, a cutter disposed in front of said frame, a member extending forwardly from said frame to said cutter to push the same over the ground as the roll rotates, said member being connected to said cutter by a ball and socket connection, and means adjustably holding said cutter against rotation on said connection on an axis transverse to the direction of movement of the cutter.

25. In a power-driven lawn mower, a ground-engaging roll having a frame mounted thereon, a cutter disposed in front of said frame, a member extending forwardly from said frame to said cutter to push the same over the ground as the roll rotates, said member being connected to said cutter by a ball and socket connection, means adjustably holding said cutter again rotation on said connection on an axis transverse to the direction of movement of the cutter, a motor on said frame, and a driving connection from said motor to said cutter so arranged with respect to said member as to resist rotation of the cutter on the ball and socket connection about an axis parallel to the direction of movement.

26. In a power-driven lawn mower, a ground-engaging roll having a frame supported thereon, a cutter disposed in front of said frame, and means to push said cutter from said frame comprising a rod disposed substantially at the transverse center of the cutter and pivoted thereto about a horizontal axis.

27. In a power-driven lawn mower, a ground-engaging roll having a frame supported thereon, a cutter spaced from said roll in the direction of travel of the mower, and means to move said cutter from said frame comprising a rod disposed substantially at the transverse center of the cutter and pivoted thereto with a ball and socket connection.

28. In a power-driven lawn mower, a ground-engaging roll having a frame supported thereon, a cutter disposed in front of said frame and having a ground-engaging shoe, a push-rod secured to the frame and to the cutter adjacent said shoe, and a sub-frame comprising a member pivotally connected to the push-rod and pivotally connected to the cutter at a point vertically spaced from the connection thereto of the push-rod.

29. In a power-driven lawn mower, a ground-engaging roll having a frame supported thereon, a cutter disposed in front of said frame and having a ground-engaging shoe, a push-rod secured to the frame and to the cutter adjacent said shoe, a sub-frame comprising a member pivotally connected to the push-rod and pivotally connected to the cutter at a point vertically spaced from the connection thereto of the push-rod, and means for adjusting said sub-frame along said push-rod for the purpose set forth.

30. In a power-driven lawn mower, a ground-engaging roll having a frame supported thereon, a cutter disposed in front of said frame and having a ground-engaging shoe, a push-rod secured to the frame and to the cutter adjacent said shoe, a sub-frame comprising a member pivotally connected to the push-rod and pivotally connected to the cutter at a point vertically spaced from the connection thereto of the push-rod, and means for adjusting said push-rod on said frame.

31. In a power-driven lawn mower, a ground-engaging roll having a frame supported thereon, a cutter disposed in front of said frame and having a ground-engaging shoe, a push-rod secured to the frame and to the cutter adjacent said shoe, a sub-frame comprising a member pivotally connected to the push-rod and pivotally connected to the cutter at a point vertically spaced from the connection thereto of the push-rod, means for adjusting said push-rod on said frame, and means for adjusting said sub-frame along said push-rod for the purpose set forth.

32. In a power-driven lawn mower, a ground-engaging roll having a frame mounted thereon, a cutter disposed in front of said roll and comprising a stationary knife and a rotary knife, a ground-engaging shoe on said cutter, and a pivotal connection between said frame and cutter extending in the direction of travel, said pivotal connection being located on said cutter at a distance above the bottom of the shoe which is small compared to the length of said shoe transversely of the direction of travel.

33. In a power-driven lawn mower, a ground-engaging roll having a transversely extending shaft, a frame extending forwardly and rearwardly of said shaft and freely movable circumferentially thereof, a cutter on said frame spaced from said shaft in the direction of travel of the mower, a motor on said frame, and means to drive said roll and said cutter from said motor, said driving means being so arranged that said movement of the frame circumferentially of the shaft may occur without rotation of said roll.

34. In a power-driven lawn mower, a ground-engaging roll having a frame mounted thereon, a cutter spaced from said roll in the direction of travel of the mower, a sub-frame on which said cutter is mounted, a member connecting said frame and sub-frame, and a universal connection between said sub-frame and said member.

35. In a power-driven lawn mower, a ground-engaging roll having a transversely extending shaft, a frame extending forwardly and rearwardly of said shaft and pivoted thereon, a motor mounted on said frame rearwardly of said shaft, a cutter disposed forwardly of said shaft, and a universal connection between said frame and said cutter.

36. In a power-driven lawn mower, a ground-engaging roll having a transversely extending shaft, a frame extending forwardly and rearwardly of said shaft and pivoted thereon, a cutter on said frame forwardly of said shaft and mounted on a longitudinally extending pivot, a ground-engaging shoe on said cutter, a motor mounted on said frame, means to drive said roll and said cutter from said motor, a pivotal connection between said pivot and the cutter extending transversely of the pivot, means for adjusting the cutter on said connection, and means for locking the cutter in adjusted position.

HENRY J. STEGEMAN.
SYLVANUS D. LOCKE.